United States Patent
Feng

(10) Patent No.: US 9,426,571 B2
(45) Date of Patent: Aug. 23, 2016

(54) MULTIFUNCTIONAL WIRELESS DEVICE

(71) Applicant: Shenzhen Great Power Innovation and Technology Enterprise Co., Ltd., Shenzhen (CN)

(72) Inventor: Qixiang Feng, Shenzhen (CN)

(73) Assignee: Shenzhen Great Power Innovation and Technology Enterprise Co., Ltd., Shenzhen, Guangdong Province (CN)

( * ) Notice: Subject to any disclaimer, the term of this patent is extended or adjusted under 35 U.S.C. 154(b) by 0 days.

(21) Appl. No.: 14/562,283

(22) Filed: Dec. 5, 2014

(65) Prior Publication Data
US 2016/0165349 A1    Jun. 9, 2016

(51) Int. Cl.
*H04R 3/12* (2006.01)
*H04W 4/00* (2009.01)
*H04M 1/725* (2006.01)
*G06F 3/16* (2006.01)

(52) U.S. Cl.
CPC ........ *H04R 3/12* (2013.01); *G06F 3/165* (2013.01); *H04M 1/7253* (2013.01); *H04W 4/008* (2013.01)

(58) Field of Classification Search
CPC ....... H04R 3/12; G06F 3/165; H04M 1/7253; H04W 4/008
USPC ............... 84/609, 625, 645; 381/311, 74, 77; 455/41.2, 466, 557; 600/301; 700/94; 315/158; 340/815.4; 345/173; 368/83; 482/4; 715/765
See application file for complete search history.

(56) References Cited

U.S. PATENT DOCUMENTS

| | | | | |
|---|---|---|---|---|
| 8,288,641 B2 * | 10/2012 | Wilson | ................. | G10H 1/0058 84/625 |
| 8,379,492 B2 * | 2/2013 | Feng | ...................... | G04G 19/06 368/155 |
| 8,519,963 B2 * | 8/2013 | Kocienda | ............ | G06F 3/04883 345/173 |
| 8,865,994 B2 * | 10/2014 | Okano | ................. | G10H 1/0066 84/609 |
| 8,954,099 B2 * | 2/2015 | Forutanpour | ......... | G06F 1/1626 345/158 |
| 9,182,965 B2 * | 11/2015 | Khushraj | .................. | G06F 8/61 |
| 2003/0121401 A1 * | 7/2003 | Ito | ........................ | G10H 1/0083 84/625 |
| 2004/0069122 A1 * | 4/2004 | Wilson | ................. | G10H 1/0058 84/609 |
| 2008/0222545 A1 * | 9/2008 | Lemay | ................ | G06F 3/04883 715/765 |
| 2009/0053997 A1 * | 2/2009 | Jobling | ..................... | G06F 3/01 455/41.2 |

(Continued)

*Primary Examiner* — Gerald Gauthier
(74) *Attorney, Agent, or Firm* — Novoclaims Patent Services LLC; Mei Lin Wong

(57) ABSTRACT

A multifunctional music player wirelessly communicates with a mobile device, and includes a main casing, a speaker provided on the main casing, a main wireless transceiver provided in the main casing, and a main processing unit. The main processing unit is supported in the main casing and is electrically connected to the speaker, and the main wireless transceiver. The main wireless transceiver is arranged to receive wireless signals from the mobile device. The wireless signals is transmitted to the main processing unit which drives the speaker to deliver audible sound corresponding to the wireless signals, so that a user is able to control playing of music in the multifunctional music player by operating on the mobile device.

14 Claims, 6 Drawing Sheets

(56) References Cited

U.S. PATENT DOCUMENTS

| | | | | |
|---|---|---|---|---|
| 2009/0133567 A1* | 5/2009 | Okano | G10H 1/0066 | 84/609 |
| 2009/0154740 A1* | 6/2009 | Regen | H04R 1/1041 | 381/311 |
| 2010/0174390 A1* | 7/2010 | Garrett | H04M 1/0256 | 700/94 |
| 2010/0188345 A1* | 7/2010 | Keskin | G06F 3/045 | 345/173 |
| 2010/0277081 A1* | 11/2010 | Feng | H05B 33/0854 | 315/158 |
| 2011/0051563 A1* | 3/2011 | Feng | G04G 19/06 | 368/83 |
| 2012/0165071 A1* | 6/2012 | Hsu | G06F 1/1632 | 455/557 |
| 2013/0072764 A1* | 3/2013 | Shtalryd | A61B 5/08 | 600/301 |
| 2013/0094660 A1* | 4/2013 | Weinstein | H04R 1/10 | 381/74 |
| 2015/0238819 A1* | 8/2015 | Volkerink | A63B 24/0087 | 482/4 |
| 2015/0341302 A1* | 11/2015 | Balachandran | H04L 51/24 | 340/815.4 |

* cited by examiner

MULTIFUNCTIONAL WIRELESS DEVICE

BACKGROUND OF THE PRESENT INVENTION

1. Field of Invention

The present invention relates to a music player, and more particularly to a wireless multifunctional music player which may be controlled and set up by a mobile device through the use of wireless technology.

2. Description of Related Arts

A conventional music player, such as a conventional portable MP3 player or a sound box, is usually controlled and operated in which a user must physically operate on switches or buttons provided on the music player. For some music players, remote controls are available and a user may be able to control the operation of the music player at a distance therefrom.

There are several disadvantages for this type of music player. First, the music player as described above cannot be controlled by a mobile device, such as a smartphone. As mentioned above, the music player can only be controlled through operating on the switches or buttons provided on the music player, or through operating on a specifically designed remote control.

Second, conventional music players such as the one described above do not have any other functions. For example, the conventional music player is not capable of recharging other electronic devices such as smartphones or tablet computers. As a result, a user has to bring many accessories with him for recharging different types of electronic devices. This imparts great inconvenience to the user.

SUMMARY OF THE PRESENT INVENTION

An objective of the present invention is to provide a wireless multifunctional music playing system which comprises a mobile device and a multifunctional music player which is wirelessly connected to the mobile device, and may be controlled and monitored by the mobile device through a predetermined wireless technology.

Another objective of the present invention is to provide a wireless multifunctional music playing system comprising a multifunctional music player which may be utilized for charging other electronic devices, such as a smartphone or a tablet computer.

Another objective of the present invention is to provide a wireless multifunctional music playing system comprising a multifunctional music player which may be wirelessly controlled by a mobile device through BLUETOOTH wireless transmission technology.

In one aspect of the present invention, it provides a wireless multifunctional music playing system, which comprises:

a multifunctional music player, which comprises:
a main casing;
a speaker provided on the main casing;
a main wireless transceiver provided in the main casing; and
a main processing unit supported in the main casing and electrically connected to the speaker and the main wireless transceiver; and
a mobile device which is connected to internet, and comprises:
a mobile casing;
a control panel supported on the mobile casing;
a mobile wireless transceiver supported by the mobile casing, and wirelessly communicated with the main wireless transceiver of the multifunctional music player; and
a mobile processing unit supported in the mobile casing and electrically connected to the control panel, and the mobile wireless transceiver, the mobile processing unit being configured to communicate with the main processing unit via the main wireless transceiver and the mobile wireless transceiver for driving the speaker to deliver audible sound, whereby a user is able to control playing of music in the multifunctional music player by operating on the control panel of the mobile device.

In another aspect of the present invention, it provides a multifunctional music player for use with a mobile device, comprising:

a main casing;
a speaker provided on the main casing;
a main wireless transceiver provided in the main casing for communicating with the mobile device in a wireless manner; and
a main processing unit supported in the main casing and electrically connected to the speaker, whereby the mobile device is capable of wirelessly transmitting signals to the main processing unit via the main wireless transceiver such that the main processing unit is arranged to drive the speaker to deliver audible sound according to the signals transmitted from the mobile device.

DETAILED DESCRIPTION OF THE PREFERRED EMBODIMENT

Figure 1:
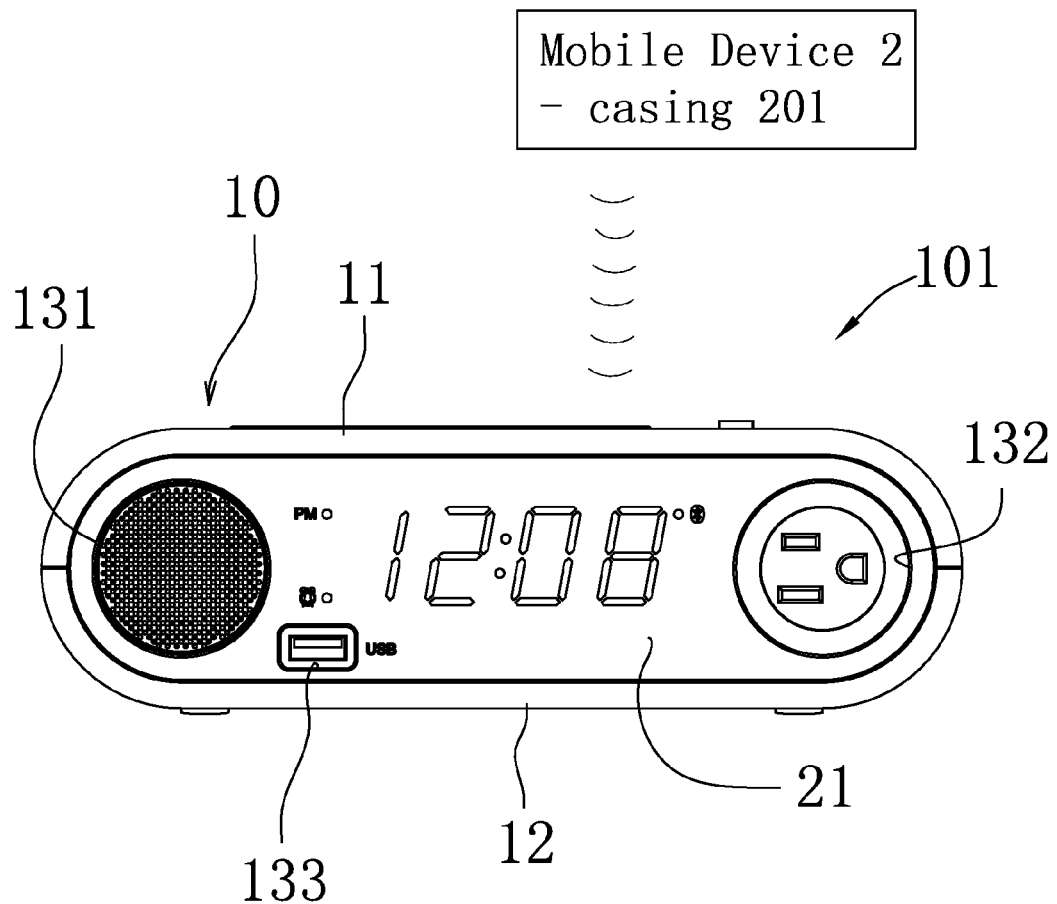
FIG. 1 is a perspective view of a wireless multifunctional music playing system according to a preferred embodiment of the present invention.

Referring to FIG. 1 to FIG. 7 of the drawings, a wireless multifunctional music playing system according to a preferred embodiment of the present invention is illustrated. The wireless alarm system comprises a multifunctional music player 10, and a mobile device 2 wirelessly communicating with the multifunctional music player 10.

The multifunctional music player 10 comprises a main casing 101, a speaker 342 provided on the main casing 101, a main wireless transceiver 32 provided in the main casing 101, and a main processing unit 30 supported in the main casing 101 and electrically connected to the speaker 342, and the main wireless transceiver 32. The speaker 342 is supported within a receiving member 341, which is connected to a perforated panel 343 through a protrusion 3411. The perforated panel 343 is mounted on the front panel 13. The speaker 342 is supported behind the perforated panel 343.

The mobile device 2 can be connected to the internet, and comprises a mobile casing 201, a control panel 202 supported on the mobile casing 201, a mobile wireless transceiver 203 supported by the mobile casing 201, and wirelessly communicated with the main wireless transceiver 32 of the multifunctional music player 10, and a mobile processing unit 204 supported in the mobile casing 201 and electrically connected to the control panel 202, and the mobile wireless transceiver 203. The mobile processing unit 204 is configured to communicate with the main processing unit 30 via the main wireless transceiver 32 and the mobile wireless transceiver 203 for driving the speaker 342 to deliver audible sound, so that a user is able to control playing of music in the multifunctional music player 10 by operating on the control panel 202 of the mobile device 2. The mobile device 2 may be embodied as a smartphone or other handheld electronic device which may wirelessly transmits signals via BLUETOOTH connectivity.

It is important to mention at this stage that the multifunctional music player 10 and the mobile device 2 can come as a set. Alternatively, the multifunctional music player 10 may be manufactured to fit existing mobile device 2 which is embodied as a smartphone or other electronic devices. When the mobile device 2 is programmed to communicate with the multifunctional music player 10 via BLUETOOTH technology, the multifunctional music player 10 can be wirelessly controlled by the mobile device 2.

Figure 2:
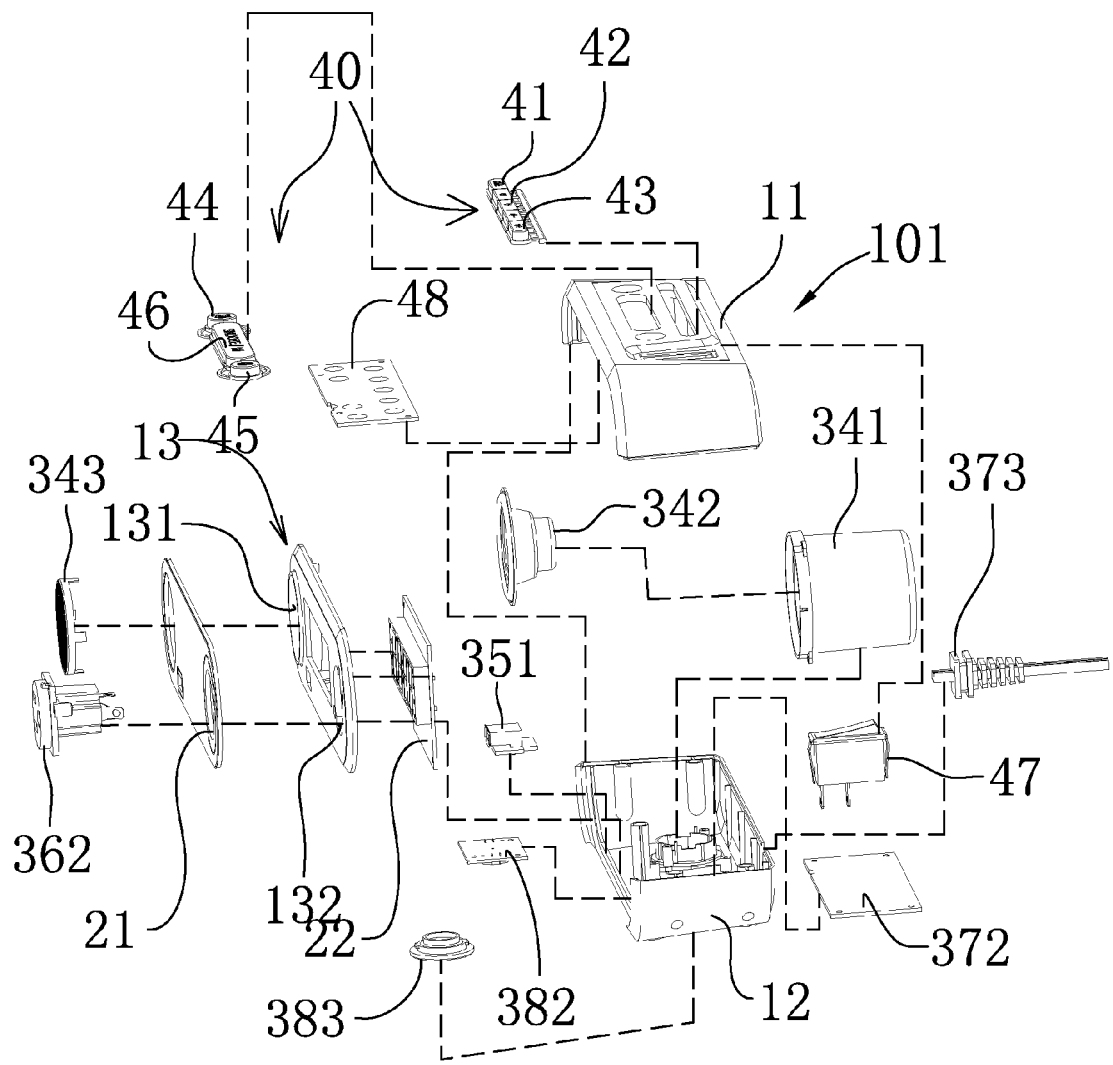
FIG. 2 is an exploded perspective view of a multifunctional music player according to the preferred embodiment of the present invention.
Figure 3:
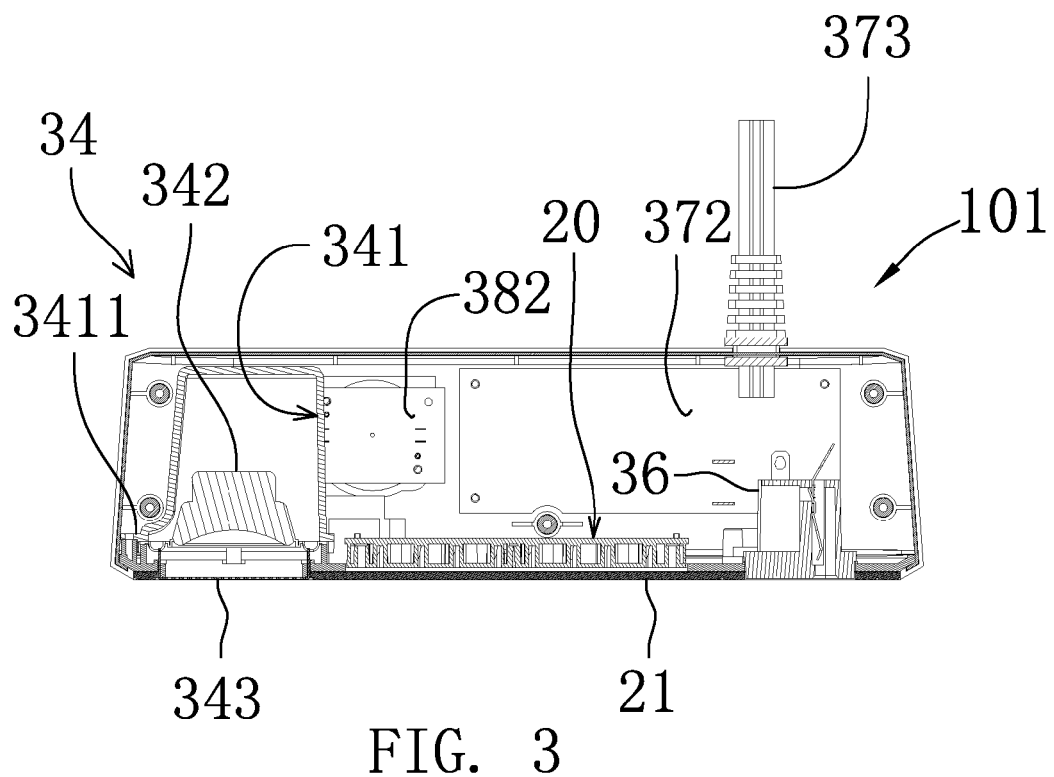
FIG. 3 is a sectional side view of the multifunctional music player according to the preferred embodiment of the present invention.
Figure 4:
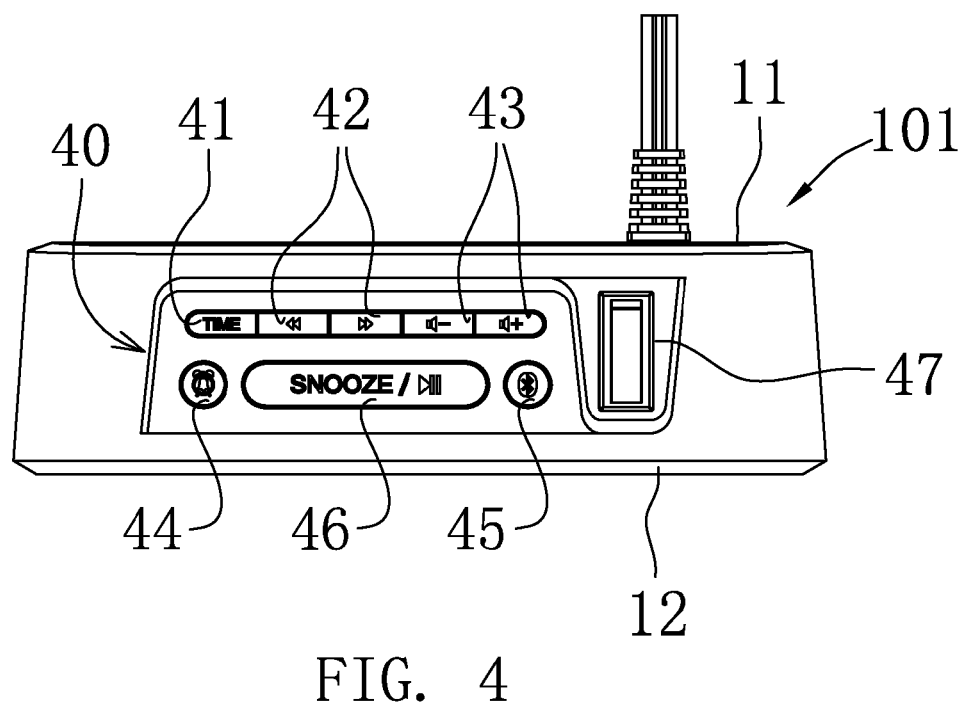
FIG. 4 is a block diagram of the multifunctional music player according to the preferred embodiment of the present invention.

According to the preferred embodiment of the present invention, the main casing 101 of the multifunctional music player 10 comprises a upper casing 11, a lower casing 12 provided underneath the upper casing 11, and a front panel 13 provided at a front side of the main casing 101. A receiving cavity 14 is formed within the upper casing 11, the lower casing 12 and the front panel 13 for accommodating the other components of the multifunctional music player 10. The upper casing 11 has a plurality of button slots 111 formed on a top surface thereof. As shown in FIG. 1 and FIG. 2 of the drawings, the front panel 13 has a plurality of speaker holes 131, a power supplying slot 132, and a USB slot 133.

The multifunctional music player 10 further comprises a display unit 20 mounted on the front panel 13 for illustrating an operation status of the multifunctional music player 10. The display unit 20 comprises a LED display 21 provided on the front panel 13 and is electrically connected to the main processing unit 30, and a LED circuit board 22 mounted in the main casing 101. The LED circuit board 22 has a LED display circuitry 23 implemented thereon for displaying time information on the LED display in a digital format.

Figure 6:
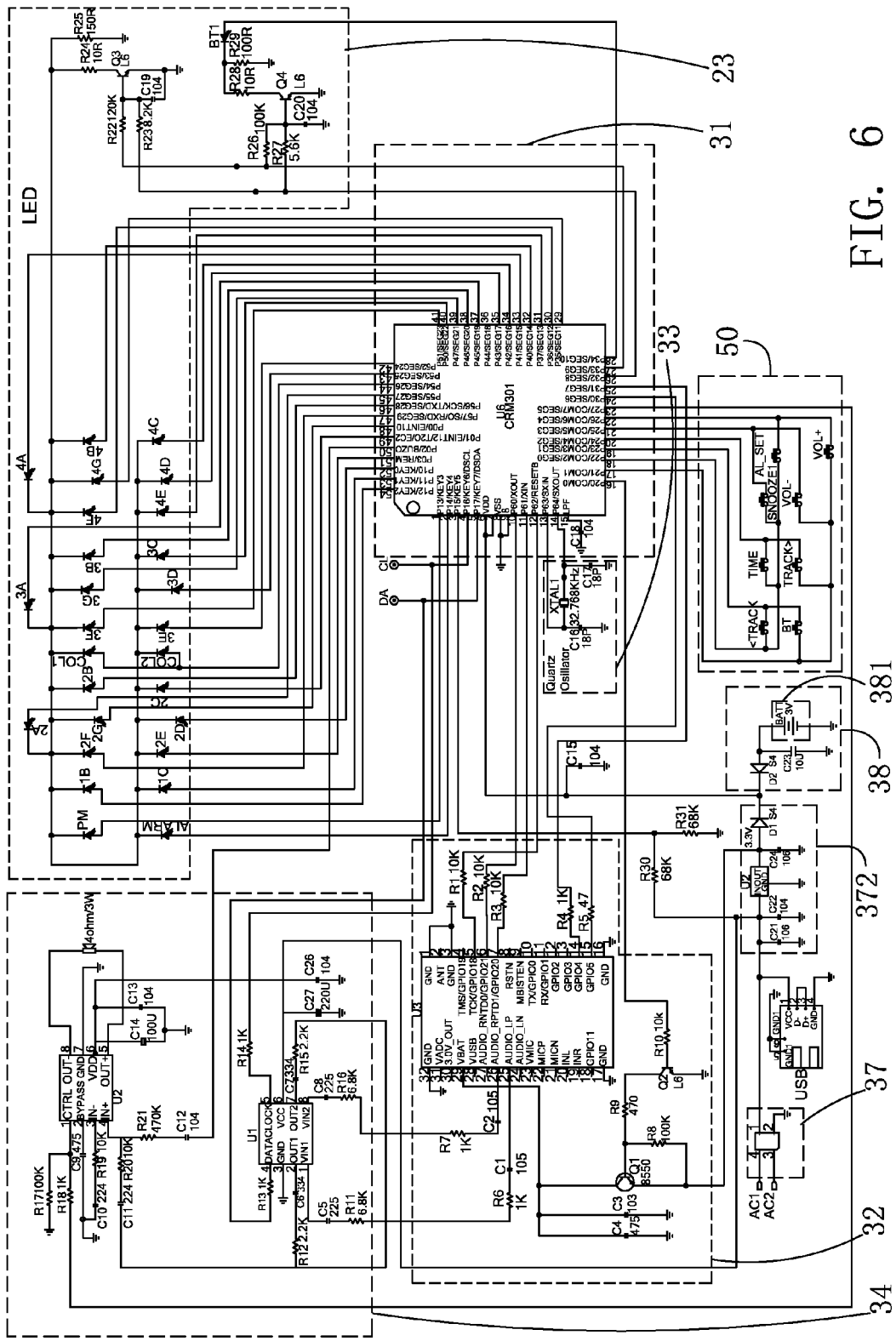
FIG. 6 is a circuit diagram of the multifunctional music player according to the preferred embodiment of the present invention.
Figure 7:
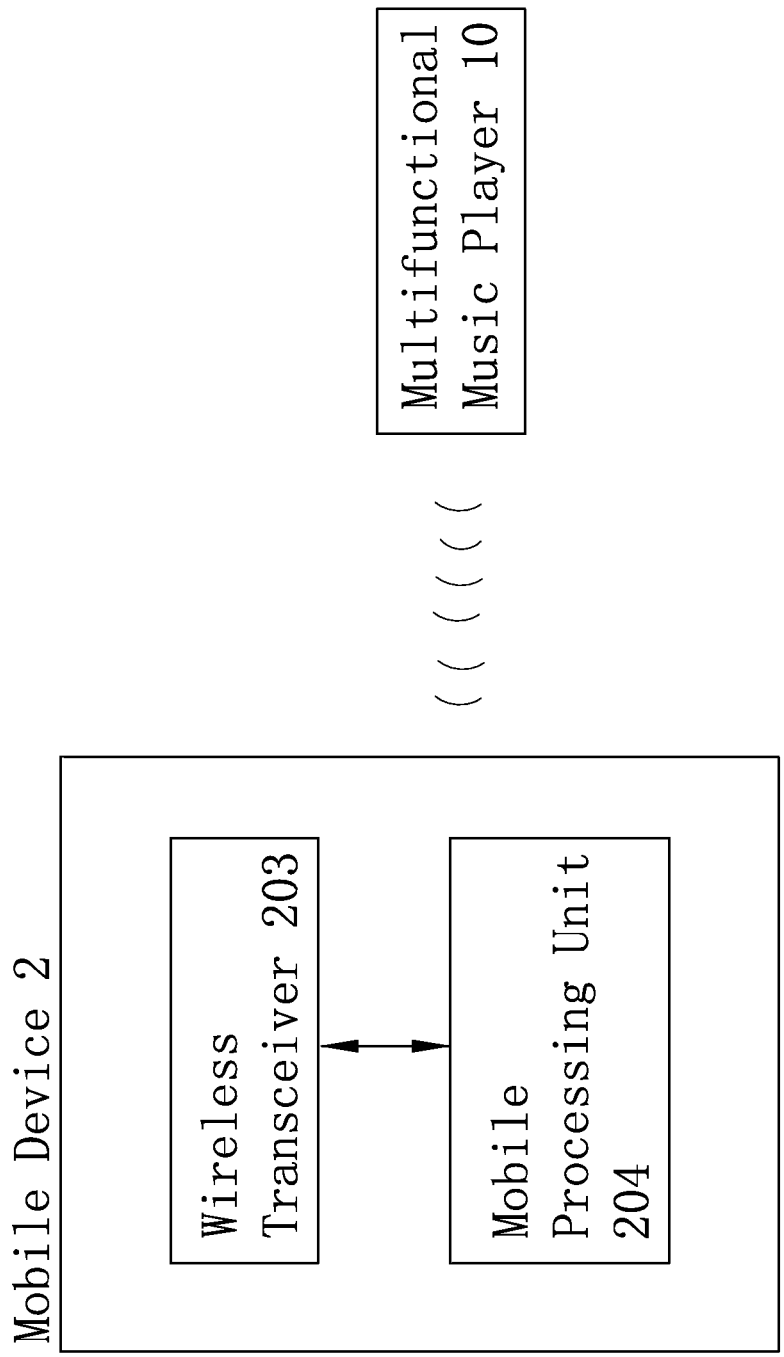
FIG. 7 is a block diagram of the multifunctional music playing system according to the preferred embodiment of the present invention.

As shown in FIG. 6 of the drawings, the LED display circuitry 23 comprises a plurality of LEDs 231 electrically connected in a predetermined manner to display the time information in a digital format. As shown in FIG. 6, LED 1B and LED 1C are utilized for displaying a first digit of hour display, while LED 2A to LED 2G are utilized for displaying a second digit of the hour display. LED COL 1 and LED COL 2 are utilized for displaying a dot between the hour digits and the minute digits on the LED display 21. Moreover, LED 3A to LED 3G are utilized for displaying a first digit of a minute display, while LED 4A to LED 4G are utilized for displaying a second digit of the minute display. LED BT1 is utilized for signaling an operation status of the main wireless transceiver 32. The LED PM is utilized for displaying afternoon, while LED ALARM is utilized for displaying an operation status of an alarm accommodated in the main casing 101. The LED display circuitry 23 is electrically connected to the main processing unit 30.

The multifunctional music player 10 further comprises a timepiece module 33, an audio unit 34, a USB port 35 provided on the main casing 101 for electrically connecting to the electronic device, a power socket 36 provided on the main casing 101 for electrically connecting to an external AC power source, a switching module 37, and a power supplying module 38 accommodated and supported in the main casing 101. The main processing unit 31 comprises a microcontroller 311 electrically connected to other components of the multifunctional music player 10. The switching module 37 is electrically connected between the power socket 36 and the main processing unit 31 so as to modulate the AC power acquired from the external power source. The power supplying module 38 is electrically connected to the timepiece module 33 for supplying back-up power to the timepiece module 33 when the multifunctional music player is not connected to the external AC power source.

The microcontroller 311 of the main processing unit 31 is preferably a CRM301 microprocessor and is electrically connected to the main wireless transceiver 32, the timepiece module 33, the audio unit 34, the switching module 37, the power supplying module 38, a control button 50, and the display unit 20. In other words, the main processing unit 31 is arranged to control and coordinate the operation of the various components of the multifunctional music player 10.

Figure 5:
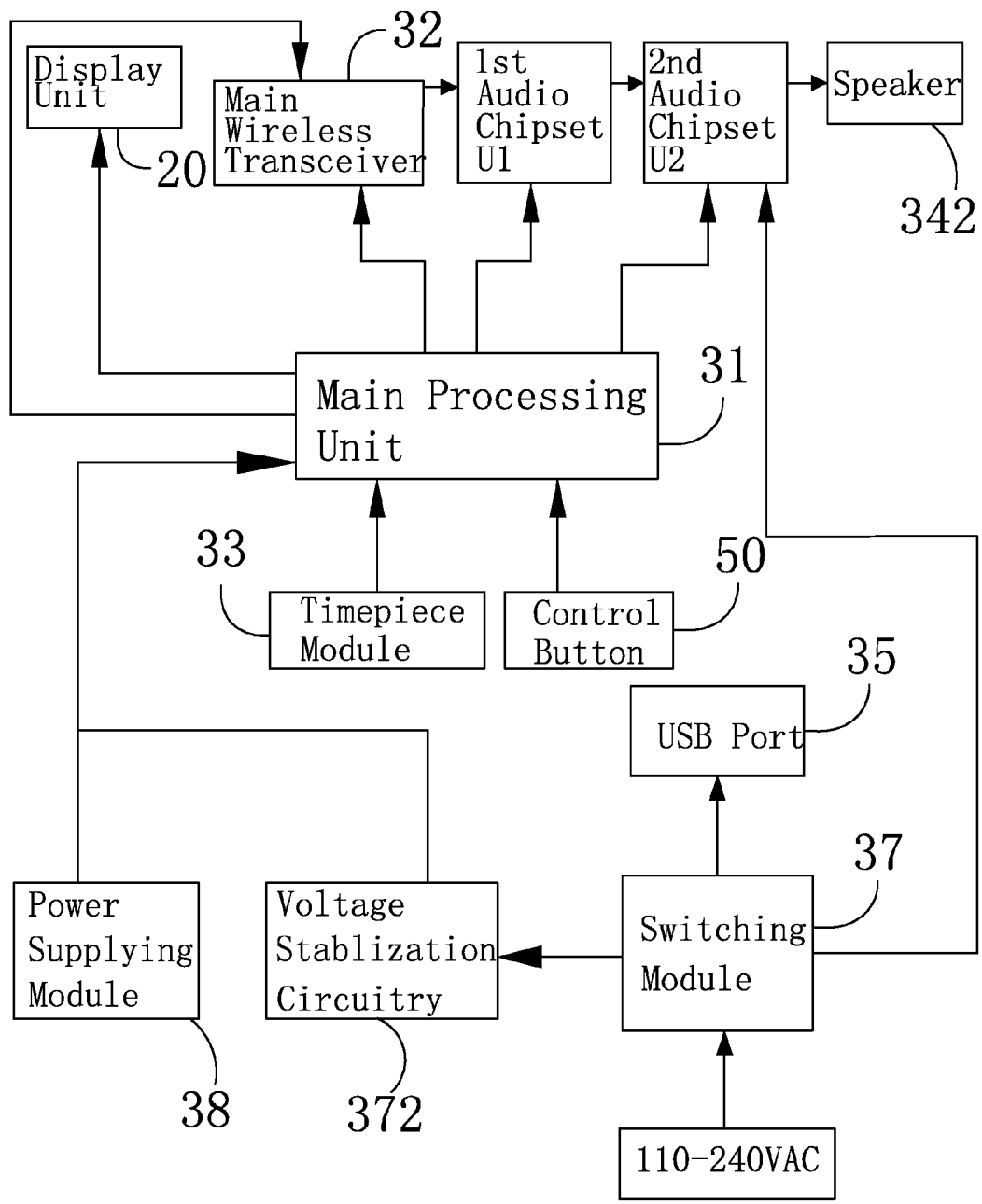
FIG. 5 is a flow diagram of the operation of the multifunctional music player according to the preferred embodiment of the present invention.

The main wireless transceiver 32 is used for receiving BLUETOOTH communication signal from the mobile device 2. As shown in FIG. 5 to FIG. 6 of the drawings, the main wireless transceiver 32 comprises a transceiver chipset U3 having a plurality of connecting ports, and an indicator 321 mounted on the front panel 13 of the main casing 101 and electrically connected to the transceiver chipset U3. On the other hand, the audio unit 34 comprises a first audio chipset U1 which is electrically connected to port 25 of the transceiver chipset U3 via capacitor C1 and capacitor C5, resistor R6 and resistor R11. Port 26 of the transceiver chipset U3 is electrically connected to the audio chipset through capacitor C2 and capacitor C8, resistor R7 and resistor 16. Port 6, port 7, port 14 and port 15 of the transceiver chipset U3 are electrically to the main processing unit 31. The wireless signal received by the transceiver chipset U3 is transmitted to the main processing unit 31 which drives and control the audio unit 34 to perform music playing. The audible sound is finally delivered by the speaker 342. When wireless transmission is in progress, the indicator 321 is arranged to illuminate.

Referring to FIG. 1, FIG. 5 and FIG. 6 of the drawings, the timepiece module 33 comprises a crystal oscillator XTAL1, capacitor C16, capacitor C17. The crystal oscillator XTAL1 is connected to the ground via capacitor C16, and is electrically connected to the main processing unit 31 via capacitor C17.

First chipset U1 of the audio unit 34 is used for amplifying audio signals. The audio unit 34 further comprises a second audio chipset U2 for amplifying the power of the audio signals. Chipset U1 has a plurality of connecting ports, wherein port 1 and port 8 are connected to the transceiver chipset U3. On the other hand, port 2 and port 7 of the first audio chipset U1 are connected to the second audio chipset U2. Port 6 of the first audio chipset U1 is connected to the switching module 37. Port 4 and port 5 of the first audio chipset U1 are electrically connected to the main processing unit 31.

Port 1 and port 4 of the second audio chipset U2 are electrically connected to the main processing unit 31, while port 5 and port 8 of the second audio chipset U2 are electrically connected to the speaker 342. BLUETOOTH signal is wirelessly transmitted from the mobile device 2 to the main wireless transceiver 32. The signals are then transmitted to the main processing unit 31 which drives the audio unit 34 to deliver corresponding audible sound.

As shown in FIG. 1, FIG. 5 and FIG. 6 of the drawings, the USB port 35 comprises a USB port member 351 provided on the front panel 13 of the main casing 101 at the USB slot, and is electrically connected to the switching module 37. The USB port member 351 is adapted for connecting to a wide range of electronic devices for recharging thereof.

Furthermore, the power socket 36 comprises a power socket body 361 having a plurality of socket slots 362 formed on a front side thereof, and an electrical terminal 363 formed on a rear side of the power socket body 361. The power socket body 361 is supported on the front panel 13.

The switching module 37 comprises a switching circuitry 371 adapted for electrically connecting to an external power source via an electrical cable 373, and a voltage stabilization circuitry 372 electrically connected to the switching circuitry 371. The voltage stabilization circuitry 372 comprises a voltage stabilization chipset U5 which is electrically connected to the main processing unit 31 via a capacitor C24 and a diode D1. The switching circuitry 371 is electrically connected to the USB port 35 for providing electricity thereto.

Referring to FIG. 1, FIG. 5 and FIG. 6 of the drawings, the power supplying module 38 comprises at least one battery 381 received in a battery compartment 383, and a battery circuitry 382 electrically connected to the battery 381 via a diode D2 and a capacitor C23. The battery circuitry 382 is also electrically connected to the main processing unit 31. The battery is arranged to supply power to the timepiece module 33 when the multifunctional music player 10 is not connected to the external AC power source.

The multifunctional music player 10 further comprises a plurality of control buttons provided on the main casing 101 for allowing a user to control and operation of the multifunctional music player 10. The control buttons may comprise a time setting button 41, a music playing button 42, a volume control button 43, an alarm setting button 44, a pairing button 45, a stop/continue button 46, and a switch button 47. Each of these control buttons are electrically connected to the main processing unit 31 through a control panel circuitry 48.

From the above descriptions, it can be shown that a user may be able to control playing of music by operating on the mobile device 2. Any control commands inputted to the mobile device 2 will be transmitted to the multifunctional music player 10 via BLUETOOTH technology.

The present invention, while illustrated and described in terms of a preferred embodiment and several alternatives, is not limited to the particular description contained in this specification. Additional alternatives or equivalent components could also be used to practice the present invention.

What is claimed is:

1. A wireless multifunctional music playing system, comprising:
    a multifunctional music player, which comprises:
    a main casing;
    a speaker provided on said main casing;
    a main wireless transceiver provided in said main casing; and
    a main processing unit supported in said main casing and electrically connected to said speaker, and said main wireless transceiver; and
    a mobile device which is connected to internet, and comprises:
    a mobile casing;
    a control panel supported on said mobile casing;
    a mobile wireless transceiver supported by said mobile casing, and wirelessly communicated with said main wireless transceiver of said multifunctional music player; and
    a mobile processing unit supported in said mobile casing and electrically connected to said control panel, and said mobile wireless transceiver, said mobile processing unit being configured to communicate with said main processing unit via said main wireless transceiver and said mobile wireless transceiver for driving said speaker to deliver audible sound, whereby a user is able to control playing of music in said multifunctional music player by operating on said control panel of said mobile device,
    wherein said multifunctional music player further comprises an audio unit, which comprises a first audio chipset which electrically connected to said main wireless transceiver, and a second audio chipset electrically connected to said first audio chipset and said main processing unit, wherein wireless signals from said mobile device are to be received by said main wireless transceiver, and transmitted to said main processing unit which drives said audio unit to deliver corresponding audible sound.

2. A wireless multifunctional music playing system, comprising:
    a multifunctional music player, which comprises:
    a main casing;
    a speaker provided on said main casing;
    a main wireless transceiver provided in said main casing; and
    a main processing unit supported in said main casing and electrically connected to said speaker, and said main wireless transceiver; and
    a mobile device which is connected to internet, and comprises:
    a mobile casing;
    a control panel supported on said mobile casing;
    a mobile wireless transceiver supported by said mobile casing, and wirelessly communicated with said main wireless transceiver of said multifunctional music player; and
    a mobile processing unit supported in said mobile casing and electrically connected to said control panel, and said mobile wireless transceiver, said mobile processing unit being configured to communicate with said main processing unit via said main wireless transceiver and said mobile wireless transceiver for driving said speaker to deliver audible sound, whereby a user is able to control playing of music in said multifunctional music player by operating on said control panel of said mobile device,
    wherein said multifunctional music player further comprises a USB port provided on said main casing for electrically connecting to an electronic device, said USB port comprising a USB port member provided on said front panel of said main casing, and electrically connected to said switching module, said USB port member being adapted for connecting to an electronic device for recharging thereof.

3. A wireless multifunctional music playing system, comprising:
    a multifunctional music player, which comprises:
    a main casing;
    a speaker provided on said main casing;

a main wireless transceiver provided in said main casing; and a main processing unit supported in said main casing and electrically connected to said speaker, and said main wireless transceiver; and a mobile device which is connected to internet, and comprises:

a mobile casing;

a control panel supported on said mobile casing;

a mobile wireless transceiver supported by said mobile casing, and wirelessly communicated with said main wireless transceiver of said multifunctional music player; and a mobile processing unit supported in said mobile casing and electrically connected to said control panel, and said mobile wireless transceiver, said mobile processing unit being configured to communicate with said main processing unit via said main wireless transceiver and said mobile wireless transceiver for driving said speaker to deliver audible sound, whereby a user is able to control playing of music in said multifunctional music player by operating on said control panel of said mobile device, wherein said multifunctional music player further comprises a timepiece module which comprises a crystal oscillator electrically connected to said main processing unit.

4. A wireless multifunctional music playing system, comprising:

a multifunctional music player, which comprises:

a main casing;

a speaker provided on said main casing;

a main wireless transceiver provided in said main casing; and a main processing unit supported in said main casing and electrically connected to said speaker, and said main wireless transceiver; and a mobile device which is connected to internet, and comprises:

a mobile casing;

a control panel supported on said mobile casing;

a mobile wireless transceiver supported by said mobile casing, and wirelessly communicated with said main wireless transceiver of said multifunctional music player; and a mobile processing unit supported in said mobile casing and electrically connected to said control panel, and said mobile wireless transceiver, said mobile processing unit being configured to communicate with said main processing unit via said main wireless transceiver and said mobile wireless transceiver for driving said speaker to deliver audible sound, whereby a user is able to control playing of music in said multifunctional music player by operating on said control panel of said mobile device, wherein said multifunctional music player further comprises a power socket provided on said main casing for electrically connecting to an external AC power source, and a switching module is electrically connected between said power socket and said main processing unit so as to modulate said AC power acquired from said external power source.

5. The wireless multifunctional music playing system, as recited in claim 4, wherein said switching module comprises a switching circuitry adapted for electrically connecting to an external power source, and a voltage stabilization circuitry electrically connected to said switching circuitry.

6. A wireless multifunctional music playing system, comprising:

a multifunctional music player, which comprises:

a main casing;

a speaker provided on said main casing;

a main wireless transceiver provided in said main casing; and a main processing unit supported in said main casing and electrically connected to said speaker, and said main wireless transceiver; and a mobile device which is connected to internet, and comprises:

a mobile casing;

a control panel supported on said mobile casing;

a mobile wireless transceiver supported by said mobile casing, and wirelessly communicated with said main wireless transceiver of said multifunctional music player; and a mobile processing unit supported in said mobile casing and electrically connected to said control panel, and said mobile wireless transceiver, said mobile processing unit being configured to communicate with said main processing unit via said main wireless transceiver and said mobile wireless transceiver for driving said speaker to deliver audible sound, whereby a user is able to control playing of music in said multifunctional music player by operating on said control panel of said mobile device, wherein said multifunctional music player further comprises a power supplying module which comprises at least one battery, a battery compartment received in said main casing for accommodating said battery, and a battery circuitry electrically connected to said battery, said battery circuitry being electrically connected to said main processing unit and said timepiece module for supplying back-up power thereto.

7. A wireless multifunctional music playing system, comprising:

a multifunctional music player, which comprises:

a main casing;

a speaker provided on said main casing;

a main wireless transceiver provided in said main casing; and a main processing unit supported in said main casing and electrically connected to said speaker, and said main wireless transceiver; and a mobile device which is connected to internet, and comprises:

a mobile casing;

a control panel supported on said mobile casing;

a mobile wireless transceiver supported by said mobile casing, and wirelessly communicated with said main wireless transceiver of said multifunctional music player; and a mobile processing unit supported in said mobile casing and electrically connected to said control panel, and said mobile wireless transceiver, said mobile processing unit being configured to communicate with said main processing unit via said main wireless transceiver and said mobile wireless transceiver for driving said speaker to deliver audible sound, whereby a user is able to control playing of music in said multifunctional music player by operating on said control panel of said mobile device, wherein said multifunctional music player further comprises a timepiece module, an audio unit, a switching module, and a display unit supported in said main casing, said main processing unit comprising a microcontroller electrically connected to said main wireless transceiver, said timepiece module, said audio unit, said switching module, and said display unit, for controlling and coordinating an operation of said main wireless transceiver, said timepiece module, said audio unit, said switching module, and said display unit.

8. A multifunctional music player wirelessly communicating with a mobile device, comprising:
a main casing;
a speaker provided on said main casing;
a main wireless transceiver provided in said main casing; and
a main processing unit supported in said main casing and electrically connected to said speaker, and said main wireless transceiver, said main wireless transceiver being arranged to receive wireless signals from said mobile device, said wireless signals being transmitted to said main processing unit which drives said speaker to deliver audible sound corresponding to said wireless signals, whereby a user is able to control playing of music in said multifunctional music player by operating on said mobile device,
wherein said multifunctional music player further comprises an audio unit, which comprises a first audio chipset which electrically connected to said main wireless transceiver, and a second audio chipset electrically connected to said first audio chipset and said main processing unit.

9. A multifunctional music player wirelessly communicating with a mobile device, comprising:
a main casing;
a speaker provided on said main casing;
a main wireless transceiver provided in said main casing; and
a main processing unit supported in said main casing and electrically connected to said speaker, and said main wireless transceiver, said main wireless transceiver being arranged to receive wireless signals from said mobile device, said wireless signals being transmitted to said main processing unit which drives said speaker to deliver audible sound corresponding to said wireless signals, whereby a user is able to control playing of music in said multifunctional music player by operating on said mobile device,
wherein said multifunctional music player further comprises a USB port provided on said main casing for electrically connecting to an electronic device, said USB port comprising a USB port member provided on said front panel of said main casing, and electrically connected to said switching module, said USB port member being adapted for connecting to an electronic device for recharging thereof.

10. A multifunctional music player wirelessly communicating with a mobile device, comprising:
a main casing;
a speaker provided on said main casing;
a main wireless transceiver provided in said main casing; and
a main processing unit supported in said main casing and electrically connected to said speaker, and said main wireless transceiver, said main wireless transceiver being arranged to receive wireless signals from said mobile device, said wireless signals being transmitted to said main processing unit which drives said speaker to deliver audible sound corresponding to said wireless signals, whereby a user is able to control playing of music in said multifunctional music player by operating on said mobile device,
wherein said multifunctional music player further comprises a timepiece module which comprises a crystal oscillator electrically connected to said main processing unit.

11. A multifunctional music player wirelessly communicating with a mobile device, comprising:
a main casing;
a speaker provided on said main casing;
a main wireless transceiver provided in said main casing; and
a main processing unit supported in said main casing and electrically connected to said speaker, and said main wireless transceiver, said main wireless transceiver being arranged to receive wireless signals from said mobile device, said wireless signals being transmitted to said main processing unit which drives said speaker to deliver audible sound corresponding to said wireless signals, whereby a user is able to control playing of music in said multifunctional music player by operating on said mobile device,
wherein said multifunctional music player further comprises a power socket provided on said main casing for electrically connecting to an external AC power source, and a switching module is electrically connected between said power socket and said main processing unit so as to modulate said AC power acquired from said external power source.

12. The wireless multifunctional music playing system, as recited in claim 11, wherein said switching module comprises a switching circuitry adapted for electrically connecting to an external power source, and a voltage stabilization circuitry electrically connected to said switching circuitry.

13. A multifunctional music player wirelessly communicating with a mobile device, comprising:
a main casing;
a speaker provided on said main casing;
a main wireless transceiver provided in said main casing; and
a main processing unit supported in said main casing and electrically connected to said speaker, and said main wireless transceiver, said main wireless transceiver being arranged to receive wireless signals from said mobile device, said wireless signals being transmitted to said main processing unit which drives said speaker to deliver audible sound corresponding to said wireless signals, whereby a user is able to control playing of music in said multifunctional music player by operating on said mobile device,
wherein said multifunctional music player further comprises a power supplying module which comprises at least one battery, a battery compartment received in said main casing for accommodating said battery, and a battery circuitry electrically connected to said battery, said battery circuitry being electrically connected to said main processing unit and said timepiece module for supplying back-up power thereto.

14. A multifunctional music player wirelessly communicating with a mobile device, comprising:
a main casing;
a speaker provided on said main casing;
a main wireless transceiver provided in said main casing; and
a main processing unit supported in said main casing and electrically connected to said speaker, and said main wireless transceiver, said main wireless transceiver being arranged to receive wireless signals from said mobile device, said wireless signals being transmitted to said main processing unit which drives said speaker to deliver audible sound corresponding to said wireless signals, whereby a user is able to control playing of music in said multifunctional music player by operating on said mobile device, wherein said multifunctional music player further comprises a timepiece module, an audio unit, a switching module, and a display unit supported in said main casing, said main processing unit comprising a microcontroller electrically connected to said main wireless transceiver, said timepiece module, said audio unit, said switching module, and said display unit, for controlling and coordinating an operation of said main wireless transceiver, said timepiece module, said audio unit, said switching module, and said display unit.

* * * * *